(12) United States Patent
Chen et al.

(10) Patent No.: US 12,250,628 B2
(45) Date of Patent: Mar. 11, 2025

(54) UPLINK TRANSMISSION CONTROL METHOD AND TERMINAL

(71) Applicant: VIVO MOBILE COMMUNICATION CO., LTD., Guangdong (CN)

(72) Inventors: Xiaohang Chen, Guangdong (CN); Xueming Pan, Guangdong (CN); Zhi Lu, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 421 days.

(21) Appl. No.: 17/719,165

(22) Filed: Apr. 12, 2022

(65) Prior Publication Data

US 2022/0240181 A1    Jul. 28, 2022

Related U.S. Application Data

(63) Continuation of application No. PCT/CN2020/119899, filed on Oct. 9, 2020.

(30) Foreign Application Priority Data

Oct. 12, 2019   (CN) .......................... 201910968935.1

(51) Int. Cl.
*H04W 52/02* (2009.01)
*H04W 72/1268* (2023.01)

(52) U.S. Cl.
CPC ... *H04W 52/0216* (2013.01); *H04W 72/1268* (2013.01)

(58) Field of Classification Search
CPC .................. H04W 52/0216; H04W 72/1268
See application file for complete search history.

(56) References Cited

U.S. PATENT DOCUMENTS

| | | | |
|---|---|---|---|
| 11,419,123 B2* | 8/2022 | Fakoorian | H04W 72/0453 |
| 11,452,167 B2* | 9/2022 | Yang | H04W 76/34 |
| 2016/0095087 A1 | 3/2016 | Mohseni et al. | |
| 2019/0044649 A1* | 2/2019 | Kim | H04L 1/00 |
| 2019/0149269 A1* | 5/2019 | Chatterjee | H04L 5/0094 |
| | | | 370/329 |
| 2019/0158334 A1* | 5/2019 | Kim | H04L 5/0037 |

(Continued)

FOREIGN PATENT DOCUMENTS

| | | |
|---|---|---|
| CN | 110324846 A | 10/2019 |
| WO | 2019184688 A1 | 10/2019 |

OTHER PUBLICATIONS

First Office Action for Indian Application No. 202227027170, dated Nov. 3, 2022, 6 Pages (including English Translation).

(Continued)

*Primary Examiner* — Parth Patel
(74) *Attorney, Agent, or Firm* — BROOKS KUSHMAN P.C.

(57) ABSTRACT

An uplink transmission control method and a terminal are provided. The method includes: monitoring uplink cancellation signaling at a first moment; determining, according to the uplink cancellation signaling, whether to cancel corresponding uplink transmission, where an interval between the first moment and a second moment of sending the uplink transmission is greater than or equal to a preset time length, and the first moment is before the second moment.

20 Claims, 5 Drawing Sheets

(56) References Cited

U.S. PATENT DOCUMENTS

| | | | |
|---|---|---|---|
| 2019/0254067 A1* | 8/2019 | Al-Imari | H04W 72/1268 |
| 2019/0306848 A1* | 10/2019 | Zhou | H04W 72/20 |
| 2019/0313476 A1 | 10/2019 | Sun et al. | |
| 2019/0327020 A1* | 10/2019 | Gao | H04W 72/23 |
| 2019/0327755 A1* | 10/2019 | Xiong | H04L 5/0046 |
| 2019/0349927 A1* | 11/2019 | Qin | H04W 72/0446 |
| 2019/0356446 A1* | 11/2019 | Kim | H04L 5/0053 |
| 2020/0008189 A1* | 1/2020 | Yin | H04L 1/1858 |
| 2020/0015119 A1* | 1/2020 | Takeda | H04L 1/1864 |
| 2020/0137736 A1* | 4/2020 | Du | H04L 5/0053 |
| 2020/0344747 A1* | 10/2020 | Park | H04W 72/21 |
| 2020/0351897 A1* | 11/2020 | Fakoorian | H04W 72/23 |
| 2020/0383144 A1* | 12/2020 | Sun | H04L 5/0094 |
| 2021/0014029 A1* | 1/2021 | Jiao | H04W 72/23 |
| 2021/0014036 A1 | 1/2021 | Chen et al. | |
| 2021/0014866 A1* | 1/2021 | Shi | H04W 72/53 |
| 2021/0022134 A1* | 1/2021 | Chen | H04L 5/0078 |
| 2021/0037591 A1* | 2/2021 | Niu | H04L 5/0055 |
| 2021/0058948 A1* | 2/2021 | Zhao | H04L 1/0073 |
| 2021/0076409 A1* | 3/2021 | Goto | H04W 72/1268 |
| 2021/0168842 A1* | 6/2021 | Liang | H04W 72/0446 |
| 2021/0176758 A1* | 6/2021 | Bae | H04L 1/1864 |
| 2021/0185543 A1* | 6/2021 | Xu | H04L 5/0048 |
| 2021/0360610 A1* | 11/2021 | Kim | H04W 72/02 |
| 2022/0158807 A1* | 5/2022 | Chen | H04L 5/0066 |
| 2022/0159701 A1* | 5/2022 | Islam | H04L 5/0053 |
| 2022/0159706 A1* | 5/2022 | Panteleev | H04L 1/08 |
| 2022/0217708 A1* | 7/2022 | Li | H04L 5/0053 |
| 2022/0217750 A1* | 7/2022 | Liu | H04W 72/21 |
| 2022/0240181 A1* | 7/2022 | Chen | H04W 72/1268 |
| 2022/0263635 A1* | 8/2022 | Li | H04W 72/569 |
| 2022/0386243 A1* | 12/2022 | Liang | H04W 72/23 |
| 2023/0011162 A1* | 1/2023 | Li | H04W 72/1268 |
| 2023/0422281 A1* | 12/2023 | Jiang | H04W 72/541 |

OTHER PUBLICATIONS

Extended European Search Report for Application No. 20874160.3-1215, dated Oct. 24, 2022, 12 Pages.

NTT DOCOMO, Inc., "UL Inter-UE Transmission Prioritization/Multiplexing," 3GPP TSG RAN WG1 #98, Agenda item 7.2.6.5, Aug. 26-30, 2019, R1-1909197, Prague, Czech Republic, 5 Pages.

First Office Action for Chinese Application No. 201910968935.1, dated Jul. 27, 2021, 8 Pages.

International Search Report and Written Opinion for Application No. PCT/CN2020/119899, dated Dec. 30, 2020, 7 Pages.

Qualcomm Incorporated, "Uplink Inter-UE Tx Multiplexing and Prioritization," 3GPP TSG-RAN WG1 #97, Agenda item 7.2.6.5, May 13-17, 2019, R1-1907285, Reno, NV, USA, 7 Pages.

Nokia et al., "UUL Inter-UE eMBB and URLLC Multiplexing Enhancements" 3GPP TSG RAN WG1 #98-Bis, Agenda item 7.2.6.5, Oct. 14-20, 2019, R1-1910868, Chongqing, China, 19 Pages.

Qualcomm Incorporated, "Uplink Inter-UE Tx Multiplexing and Prioritization," 3GPP TSG-RAN WG1 #98b, Agenda item 7.2.6.5, Oct. 14-20, 2019, R1-1911122, Chongqing, China, 9 Pages.

* cited by examiner

UPLINK TRANSMISSION CONTROL METHOD AND TERMINAL

CROSS-REFERENCE TO RELATED APPLICATIONS

This application is a continuation application of PCT International Application No. PCT/CN2020/119899 filed on Oct. 9, 2020, which claims priority to Chinese Patent Application No. 201910968935.1, filed on Oct. 12, 2019, the disclosures of which are incorporated herein by reference in their entireties.

TECHNICAL FIELD

The present disclosure relates to the field of communication technologies, and in particular, to an uplink transmission control method and a terminal.

BACKGROUND

Compared with the conventional communication systems, the 5G mobile communication system in the future needs to be adapted to more diversified scenarios and service requirements. Main scenarios of New Radio (NR) include enhanced Mobile Broadband (eMBB), massive Machine Type of Communication (mMTC), and ultra-reliable and low latency communications (URLLC). Such scenarios raise requirements, such as high reliability, a low latency, a large bandwidth, and wide coverage, on the system.

The different services have different service quality (QoS) requirements, for example, the URLLC supports low-latency and high-reliability services. To reach higher reliability, data needs to be transmitted using a lower bit rate, and in addition, faster and more accurate channel state information (CSI) feedback is required. The eMBB service supports high throughput requirements, but are not as sensitive as the URLLC to the latency and reliability. In addition, some terminals may support services with different numerology. The terminal supports both a low-latency and high-reliability service of the URLLC and a large-capacity and high-rate eMBB service.

When the eMBB service and the URLLC service require multiplexing, there are two modes. One mode is a semi-persistent resource allocation, where the transmission of the eMBB service and the transmission of the URLLC service are respectively in different resource pools. In this case, it is equivalent to reserving some time frequency resources for the URLLC service. Due to the discreteness and uncertainty of the URLLC service, resource reservation may reduce the utilization of resources. The other mode is dynamic multiplexing, where the transmission of the eMBB service and the transmission of the URLLC service share a same resource pool, and a base station dynamically schedules the eMBB transmission and the URLLC transmission for multiplexing. Due to the latency requirement of the URLLC transmission, the base station may schedule the URLLC transmission to a resource that has been allocated to the eMBB transmission. For the mode of dynamic multiplexing of the eMBB transmission and the URLLC transmission, because the reliability of the URLLC transmission needs to be ensured, impact and interference of the eMBB transmission on the URLLC transmission need to be reduced. Signaling is sent to a user of the eMBB through a network, to suspend or cancel the transmission of the eMBB service.

In the related art, a network device configures uplink cancellation signaling, and a terminal needs to keep on monitoring an uplink cancellation instruction, and determine, according to the uplink cancellation signaling, whether to cancel configured or scheduled uplink transmission, which increases the power consumption of the terminal.

SUMMARY

Embodiments of the present disclosure provide an uplink transmission control method and a terminal.

According to a first aspect, the embodiments of the present disclosure provide an uplink transmission control method, applied to a terminal, including:
monitoring uplink cancellation signaling at a first moment; and
determining, according to the uplink cancellation signaling, whether to cancel corresponding uplink transmission, where an interval between the first moment and a second moment of sending the uplink transmission is greater than or equal to a preset time length, and the first moment is before the second moment.

According to a second aspect, the embodiments of the present disclosure further provide a terminal, including:
a monitoring module, configured to monitor uplink cancellation signaling at a first moment; and
a determining module, configured to determine, according to the uplink cancellation signaling, whether to cancel corresponding uplink transmission, where
an interval between the first moment and a second moment of sending the uplink transmission is greater than or equal to a preset time length, and the first moment is before the second moment.

According to a third aspect, the embodiments of the present disclosure further provide a terminal, including: a memory, a processor, and a program stored on the memory and executable on the processor, where when executed by the processor, the program implements the steps of the foregoing uplink transmission control method.

According to a fourth aspect, the embodiments of the present disclosure further provide a non-transitory computer-readable storage medium, storing a computer program, where when executed by a processor, the computer program implements the steps of the foregoing uplink transmission control method.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure. Other accompanying drawings may further be obtained by a person of ordinary skill in the art according to the accompanying drawings.

DETAILED DESCRIPTION

The following clearly describes the technical solutions in embodiments of the present disclosure with reference to accompanying drawings in the embodiments of the present disclosure. Apparently, the described embodiments are merely some embodiments of the present disclosure rather than all of the embodiments. Based on the embodiments of the present disclosure, all other embodiments obtained by a person of ordinary skill in the art shall fall within the protection scope of the present disclosure.

In the specification and claims of this application, the terms "include" and any variants thereof are intended to cover a non-exclusive inclusion. For example, a process, method, system, product, or device that includes a series of steps or units is not necessarily limited to those steps or units that are clearly listed, but may include other steps or units not clearly listed or inherent to such a process, method, product, or device. In addition, the term "and/or" used in the specification and claims represent at least one of the connected objects. For example, A and/or B may represent the following three cases: Only A exists, only B exists, and both A and B exist.

In the embodiments of the present disclosure, terms, such as "for example", are used to represent giving an example, an illustration, or a description. Any embodiment or design scheme described with the term "exemplary" or "for example" in the embodiments of the present disclosure should not be explained as being more preferred or having more advantages than another embodiment or design scheme. Exactly, use of the word "example" or "for example" or the like is intended to present a related concept in a specific manner.

The following describes the embodiments of the present disclosure with reference to the accompanying drawings. An uplink transmission control method and a terminal provided in the embodiments of the present disclosure can be applied to a wireless communication system. The wireless communication system may be a 5G system, or an evolved Long Term Evolution (eLTE) system, or an evolution-advanced communication system.

Figure 1:
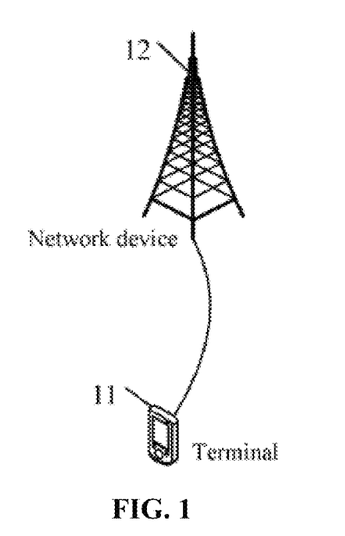
FIG. 1 is a structural diagram of a network system to which an embodiment of the present disclosure is applicable.

FIG. 1 is a structural diagram of a network system to which an embodiment of the present disclosure is applicable. As shown in FIG. 1, a terminal 11 and a network device 12 are included. The terminal 11 may be a user terminal or another terminal-side device, for example, a terminal-side device such as a mobile phone, a tablet personal computer, a laptop computer, a personal digital assistant (PDA), a mobile Internet device (MID), or a wearable device. It should be noted that a specific type of the terminal 11 is not limited in the embodiments of the present disclosure. The network device 12 may be a 5G base station, a base station of a later version, or a base station in another communication system, or may be referred to as a NodeB, an evolved NodeB, a transmission reception point (TRP), an access point (AP), or another term in the field as long as a same technical effect is achieved. The network device is not limited to a specific technical term. In addition, the network device 12 may be a master node (MN) or a secondary node (SN). It should be noted that only the 5G base station is used as an example in the embodiments of the present disclosure, but a specific type of the network device is not limited.

Figure 2:
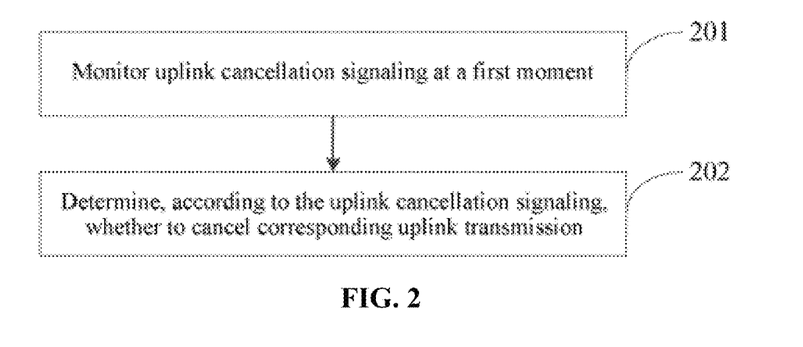
FIG. 2 is a flowchart of an uplink transmission control method according to an embodiment of the present disclosure.

FIG. 2 is a flowchart of an uplink transmission control method according to an embodiment of the present disclosure. The method is applied to a terminal, and as shown in FIG. 2, includes following steps:

Step 201: Monitor uplink cancellation signaling at a first moment.

Step 202: Determine, according to the uplink cancellation signaling, whether to cancel corresponding uplink transmission.

An interval between the first moment and a second moment of sending the uplink transmission is greater than or equal to a preset time length, and the first moment is before the second moment.

In an optional embodiment, the foregoing uplink cancellation signaling may be used to indicate cancellation of a resource for uplink transmission. Specifically, in a case that the terminal detects uplink cancellation signaling at a first moment, the terminal cancels uplink transmission if a resource indicated by the uplink cancellation signaling overlaps the uplink transmission, and skips canceling the uplink transmission if the resource indicated by the uplink cancellation signaling does not overlap the uplink transmission.

Further, in a case that the terminal does not detect the uplink cancellation signaling at the first moment, the terminal skips canceling the uplink transmission.

It should be understood that, the foregoing uplink cancellation signaling may be understood as an uplink cancellation instruction, an uplink cancellation indication, or the like. The foregoing monitoring may be understood as monitoring, interception, detection, checking, and the like.

A magnitude of the interval between the first moment and the second moment may be set according to actual needs. For example, in an embodiment, the preset time length is a minimum processing time for the terminal to cancel the uplink transmission. Because the interval between the first moment and the second moment of performing uplink transmission is set to be greater than or equal to a minimum processing time for canceling the uplink transmission, it can be ensured that the terminal, when monitoring uplink cancellation signaling and determining to cancel the uplink transmission based on the uplink cancellation signaling, has enough time to respond to the uplink cancellation signaling and perform the operation of canceling the uplink transmission. Therefore, this embodiment can ensure that the terminal has enough time to perform uplink cancellation signaling and does not continue monitoring uplink cancellation signaling between the first moment and the second moment while avoiding ineffective monitoring caused by that the uplink transmission cannot be canceled even if the uplink cancellation signaling is detected, thereby saving a quantity of electricity of the terminal.

It should be understood that the uplink transmission may be dynamically scheduled uplink transmission or higher level-configured uplink transmission, and may specifically include any one of physical uplink shared channel (PUSCH) transmission, physical uplink control channel (PUCCH), or sounding reference signal (SRS) transmission.

In the embodiments of the present disclosure, uplink cancellation signaling is monitored at a first moment; and whether to cancel corresponding uplink transmission is determined according to the uplink cancellation signaling, where an interval between the first moment and a second moment of sending the uplink transmission is greater than or equal to a preset time length, and the first moment is before the second moment. In this way, because the uplink cancellation signaling is monitored at the first moment of which a time length of an interval between the first moment and the second moment is greater than or equal to a preset time length, compared with that the terminal keeps on monitoring the uplink cancellation signaling in the related art, the embodiments of the present disclosure can effectively reduce the power consumption of the terminal.

It should be understood that, the definition of the second moment may be set according to actual needs. For example, in an optional embodiment, the second moment includes any one of the following moments:
a starting moment of a slot in which a starting position of the uplink transmission is located;
a starting moment of a sub-slot in which a starting position of the uplink transmission is located;
a starting moment of a time region in which a starting position of the uplink transmission is located; or
a moment located before a starting position of the uplink transmission and closest to the starting position of the uplink transmission in reference moments configured by a network device.

It should be noted that in another embodiment, the second moment includes any one of the following moments:
an end moment of a slot in which a starting position of the uplink transmission is located;
an end moment of a sub-slot in which a starting position of the uplink transmission is located; or
an end moment of a time region in which a starting position of the uplink transmission is located.

It should be noted that the preset time length may be agreed on in a protocol or may be configured by the network device. In an optional embodiment, the preset time length may include N time units, where N is a positive integer. The time unit includes one of a slot, a subframe, a symbol, a sub-slot, or a symbol group.

It should be understood that in a case that the network device configures a first physical downlink control channel (PDCCH) monitoring occasion for the terminal to monitor the uplink cancellation signaling at the first moment, the terminal monitors the uplink cancellation signaling at the first moment. In a case that the network device does not configure the first PDCCH monitoring occasion for the terminal to monitor the uplink cancellation signaling at the first moment, the terminal may perform monitoring in a period of time before the first moment, which is described below in detail.

In an optional embodiment, before the monitoring uplink cancellation signaling at a first moment, the method further includes:
receiving configuration information sent by a network device, where the configuration information is used for configuring a first PDCCH monitoring occasion, and the first PDCCH monitoring occasion is used for monitoring the uplink cancellation signaling at the first moment.

It should be understood that the configuration information may alternatively be used for configuring another parameter, for example, configuring a PDCCH monitoring occasion at another moment. Because the first PDCCH monitoring occasion is configured, the uplink cancellation signaling can be monitored at the first PDCCH monitoring occasion and does not need to be monitored at another moment, thereby effectively reducing the time length during which the terminal monitors the uplink cancellation signaling. Therefore, the power consumption of the terminal is reduced. Optionally, the first PDCCH monitoring occasion may include a period of time. The first moment is included in the period of time. In other words, in this embodiment, monitoring the uplink cancellation signaling at the first moment may be understood as monitoring the uplink cancellation signaling at the first PDCCH monitoring occasion corresponding to the first moment.

In another optional embodiment, the uplink cancellation signaling is monitored before the first moment in a case that a first PDCCH monitoring occasion is not configured, where the first PDCCH monitoring occasion is used for monitoring the uplink cancellation signaling at the first moment.

Optionally, the monitoring the uplink cancellation signaling before the first moment includes any one of the following:
monitoring the uplink cancellation signaling at a second PDCCH monitoring occasion closest to the first moment, where the second PDCCH monitoring occasion is before the first moment; monitoring the uplink cancellation signaling at one or more third PDCCH monitoring occasions, the third PDCCH monitoring occasion is a PDCCH monitoring occasion before the first moment; or
monitoring the uplink cancellation signaling at a PDCCH monitoring occasion between a third moment and the first moment, where the third moment is before the first moment.

In other words, in this embodiment of the present disclosure, in a case that the first PDCCH monitoring occasion is not configured, the uplink cancellation signaling may be monitored at a PDCCH monitoring occasion closest to the first PDCCH monitoring occasion in monitoring occasions before the first moment. Alternatively, the uplink cancellation signaling may be monitored at any one or more PDCCH monitoring occasions before the first moment. Further, the uplink cancellation signaling may alternatively be monitored at all PDCCH monitoring occasions in a period of time before the first moment.

Optionally, in an embodiment, the third moment is a sending moment of target downlink control information (DCI), where the target DCI is used for scheduling the uplink transmission.

In this embodiment, because the uplink cancellation signaling is monitored only between the sending moment of the target DCI and the first moment, the time length of monitoring can be effectively reduced, thereby reducing the power consumption of the terminal.

Optionally, in another embodiment, a time interval between the third moment and the sending moment of the target DCI is equal to a preset PDCCH processing time. In other words, in this embodiment, the third moment is an end moment of a PDCCH carrying the target DCI.

In this embodiment, the PDCCH processing time may be agreed on in a protocol or may be configured by the network device, and is not further limited herein. Because the PDCCH processing time is excluded, the time length during which the terminal performs monitoring is further shortened, thereby further reducing the power consumption of the terminal. In other words, in this embodiment, the third moment is a position after the end moment of a PDCCH carrying the target DCI, where an interval between the third moment and the end moment is the preset PDCCH processing time.

To make the implementation process of the present disclosure better understood, the implementation process of the present disclosure is described below in detail with reference to specific examples.

If the terminal performs uplink transmission at a moment t, the terminal monitors uplink cancellation signaling at a moment t-X.

The moment t is any one of the following:
a starting moment of a slot in which a starting position of the uplink transmission is located;
a starting moment of a sub-slot in which a starting position of the uplink transmission is located;
a starting moment of a time region in which a starting position of the uplink transmission is located; or
a moment located before a starting position of the uplink transmission and closest to the starting position of the uplink transmission in reference moments configured by a network device.

Specifically, modes in which the terminal monitors the uplink cancellation signaling include:

Mode 1: The terminal monitors the uplink cancellation signaling at a PDCCH monitoring occasion closest to and before the moment t-X. In this implementation, if at the moment t-X, the network does not configure a PDCCH monitoring occasion used for monitoring the uplink cancellation signaling, the UE monitors the uplink cancellation signaling at a PDCCH monitoring occasion closest to and before the moment t-X.

Mode 2: The terminal monitors the uplink cancellation signaling at one or more PDCCH monitoring occasions before the moment t-X (including the moment t-X).

Mode 3: The terminal monitors the uplink cancellation signaling at PDCCH monitoring occasions from a moment t1 to the moment t-X, where the moment t1≥a moment t0, and the moment t0 is a moment at which the network sends DCI for scheduling the uplink transmission. In this implementation, optionally, t1≥t0+N0, where N0 is the preset PDCCH processing time.

Optionally, X is agreed on in a protocol or configured by the network device. X is in a time unit of a slot, a subframe, a symbol, a sub-slot, or a symbol group. Further, X is a minimum processing time for canceling the uplink transmission.

Figure 3:
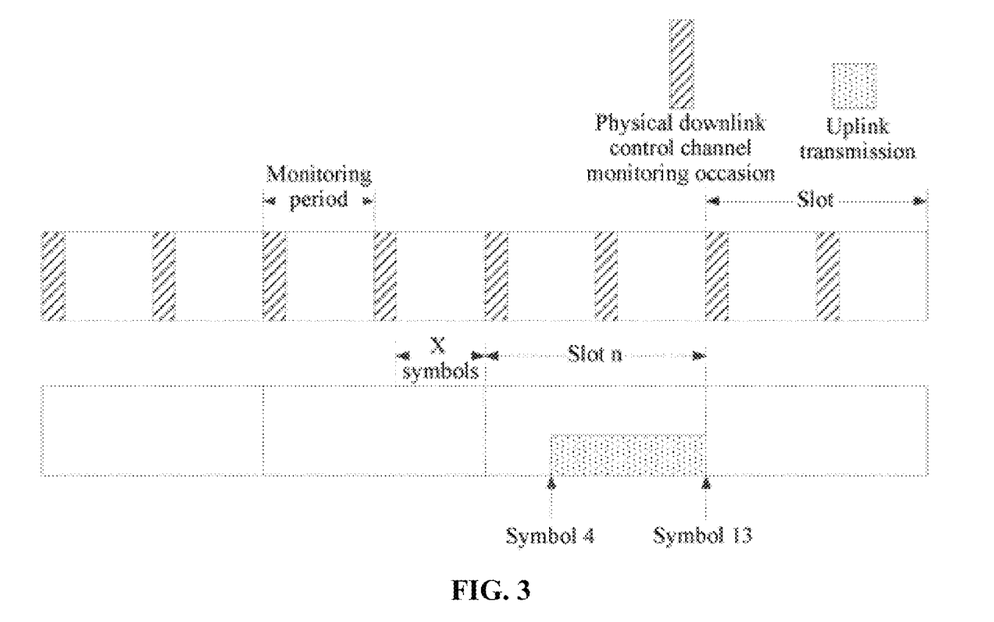
FIG. 3 is an exemplary diagram 1 of monitoring uplink cancellation signaling in an uplink transmission control method according to an embodiment of the present disclosure.

As shown in FIG. 3, in an optional embodiment, if the terminal sends a PUSCH at symbols #4 to 13 of a slot n, the terminal monitors uplink cancellation signaling on a PDCCH at X symbols before a starting position of the slot n.

Figure 4:
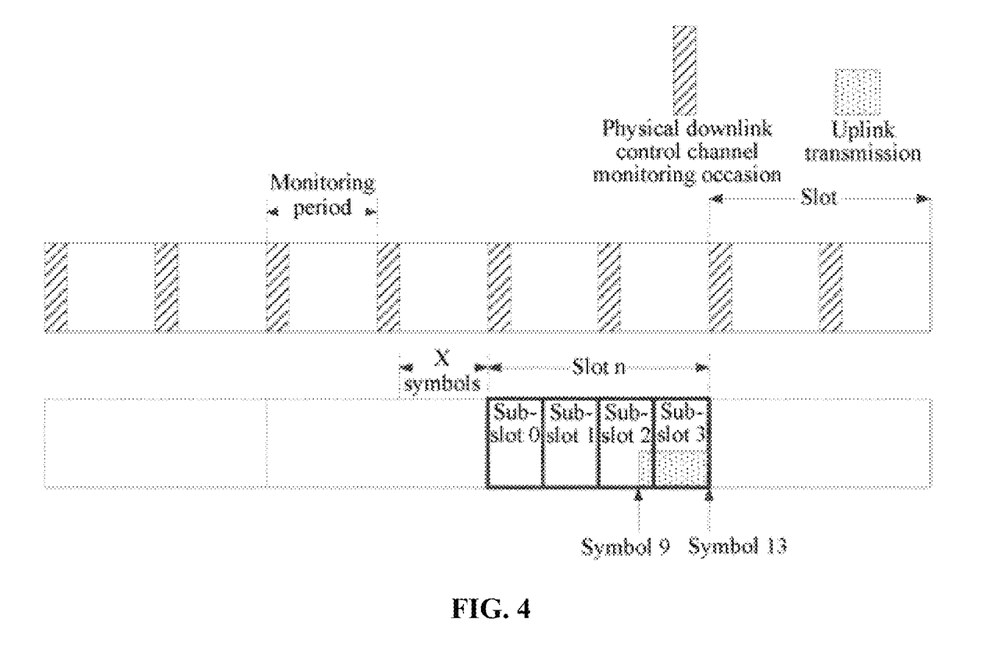
FIG. 4 is an exemplary diagram 2 of monitoring uplink cancellation signaling in an uplink transmission control method according to an embodiment of the present disclosure.

As shown in FIG. 4, in an optional embodiment, if the terminal sends a PUSCH at symbols #9 to 13 of a slot n, and the slot n includes sub-slots #0 to 3, the terminal monitors uplink cancellation signaling on a PDCCH at X symbols before a starting position of the sub-slot #2.

Figure 5:
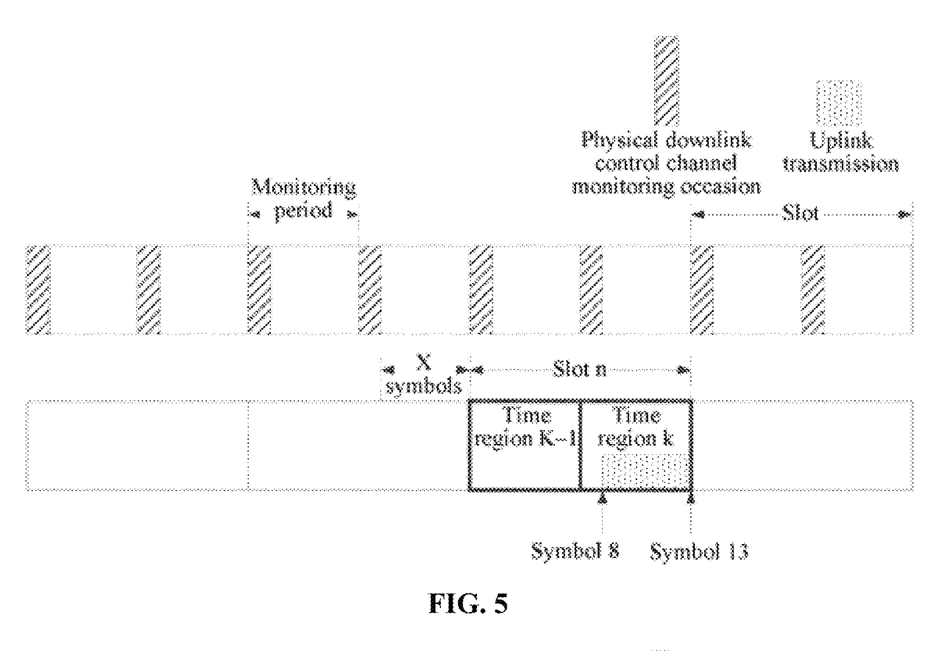
FIG. 5 is an exemplary diagram 3 of monitoring uplink cancellation signaling in an uplink transmission control method according to an embodiment of the present disclosure.

As shown in FIG. 5, in an optional embodiment, if the terminal sends a PUSCH at symbols #8 to 13 of a slot n, and a time region #k includes the PUSCH, the terminal monitors uplink cancellation signaling on PDCCHs at X symbols before a starting position of the time region #k.

Figure 6:
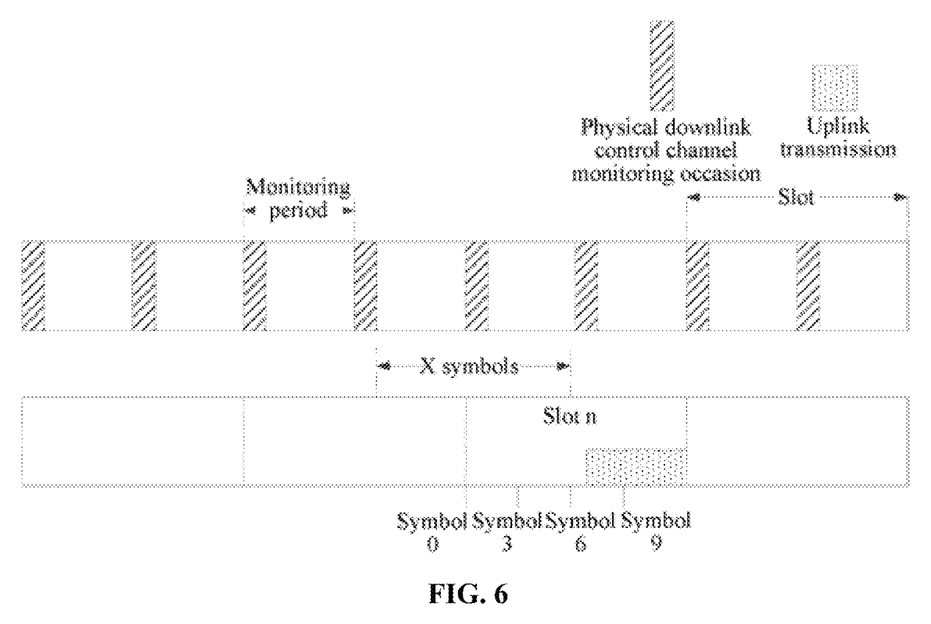
FIG. 6 is an exemplary diagram 4 of monitoring uplink cancellation signaling in an uplink transmission control method according to an embodiment of the present disclosure.

As shown in FIG. 6, in an optional embodiment, if the terminal sends a PUSCH at symbols #7 to 13 of a slot n, and reference moments configured by the network device in the slot are #0, 3, 6, and 9, the terminal monitors uplink cancellation signaling on a PDCCH at X symbols before the symbol #6.

Figure 7:
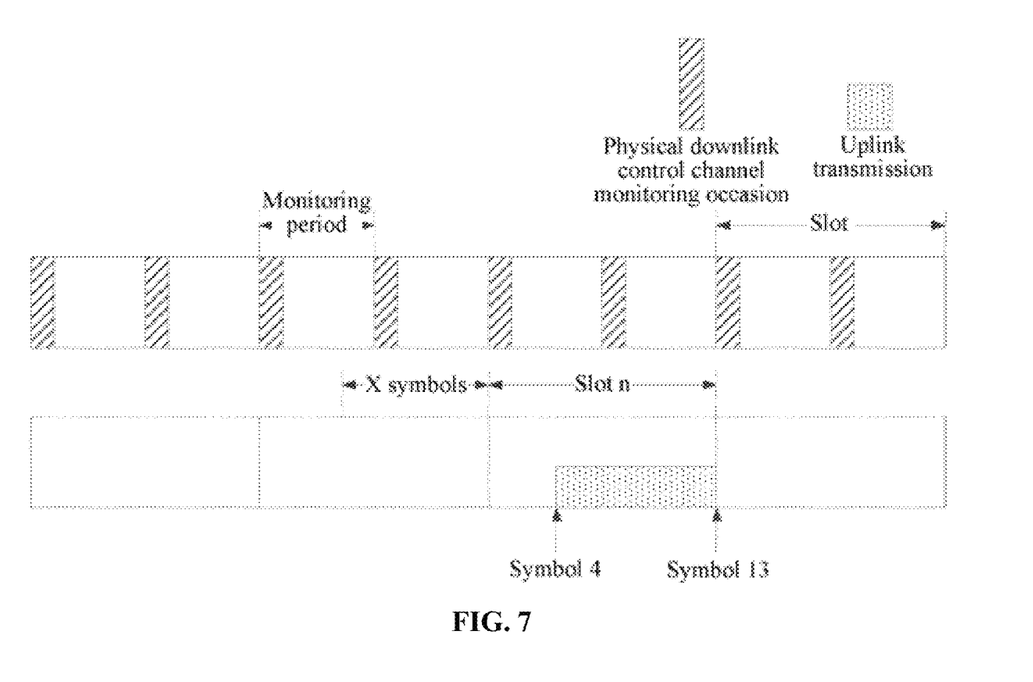
FIG. 7 is an exemplary diagram 5 of monitoring uplink cancellation signaling in an uplink transmission control method according to an embodiment of the present disclosure.

As shown in FIG. 7, in an optional embodiment, if the terminal sends a PUSCH at symbols #4 to 13 of a slot n, the terminal monitors uplink cancellation signaling on a PDCCH at X symbols before a starting position of the slot n. If the network device does not configure a PDCCH monitoring occasion for monitoring uplink cancellation signaling at a moment X symbols before the slot n, the terminal monitors the uplink cancellation signaling at a PDCCH monitoring occasion closest to and before X symbols of the slot n.

Further, in an optional embodiment, before monitoring the uplink cancellation signaling, the terminal may receive the following configuration information from the network device: a time domain indication granularity, that is, a quantity Nt of time units indicated by a time domain, where Nt is a quantity of time units in a monitoring period; and a monitoring period P of the uplink cancellation signaling.

In this embodiment, the terminal may determine a frequency domain indication granularity according to the time domain indication granularity and a correspondence in Table 1 below. Optionally, a quantity Nf of frequency units indicated by a frequency domain satisfies that: $Nf=\lfloor 14/Nt \rfloor$, where Nf is a quantity of frequency units in one frequency domain region, and the frequency domain region is a frequency range that the uplink cancellation signaling can indicate.

TABLE 1

| Monitoring period P (symbol) of uplink cancellation signaling | Quantity Nt of time units indicated by time domain | Quantity Nf of frequency units indicated by frequency domain |
| --- | --- | --- |
| 2 | 2 | 7 |
| 2 | 1 | 14 |
| 4 | 4 | 3 |
| 4 | 2 | 7 |
| 4 | 1 | 14 |
| 7 | 7 | 2 |
| 7 | 4 | 3 |
| 7 | 2 | 7 |
| 7 | 1 | 14 |
| 14 | 14 | 1 |
| 14 | 7 | 2 |
| 14 | 4 | 3 |
| 14 | 2 | 7 |
| 14 | 1 | 14 |
| 28 | 14 | 1 |
| 28 | 7 | 2 |
| 28 | 4 | 3 |
| 28 | 2 | 7 |

Further, in another optional embodiment, before monitoring the uplink cancellation signaling, the terminal may receive the following configuration information from the network device:
a time domain indication granularity, that is, a time unit Gt indicated by a time domain; and a monitoring period P of the uplink cancellation signaling.

In this embodiment, the terminal may determine a frequency domain indication granularity according to the time domain indication granularity and a correspondence in Table 2 below. Optionally, a quantity Nf of frequency units indicated by a frequency domain satisfies that: $Nf=\lfloor 14/Nt \rfloor$, where Nf is a quantity of frequency units in one frequency domain region, and the frequency domain region is a frequency range that the uplink cancellation signaling can indicate.

TABLE 2

| Monitoring period P (symbol) of uplink cancellation signaling | Time unit Gt (symbol) indicated by time domain | Quantity Nt = ⌈P/Gt⌉ of time units indicated by time domain | Quantity Nf of frequency units indicated by frequency domain |
|---|---|---|---|
| 2 | 1 | 2 | 7 |
| 2 | 2 | 1 | 14 |
| 4 | 1 | 4 | 3 |
| 4 | 2 | 2 | 7 |
| 4 | 4 | 1 | 14 |
| 7 | 1 | 7 | 2 |
| 7 | 2 | 4 | 3 |
| 7 | 4 | 2 | 7 |
| 7 | 7 | 1 | 14 |
| 14 | 1 | 14 | 1 |
| 14 | 2 | 7 | 2 |
| 14 | 4 | 4 | 3 |
| 14 | 7 | 2 | 7 |
| 14 | 14 | 1 | 14 |
| 28 | 2 | 14 | 1 |
| 28 | 4 | 7 | 2 |
| 28 | 7 | 4 | 3 |
| 28 | 14 | 2 | 7 |

Further, in another optional embodiment, before monitoring the uplink cancellation signaling, the terminal may receive the following configuration information from the network device:

a time domain indication granularity, that is, a quantity Nt of time units indicated by a time domain, where Nt is a quantity of time units in a time domain region; and a length T of a time domain region (the time domain region is a time range that uplink cancellation signaling can indicate).

In this embodiment, the terminal may determine a frequency domain indication granularity according to the time domain indication granularity and a correspondence in Table 3 below. Optionally, a quantity Nf of frequency units indicated by a frequency domain satisfies that: $Nf=\lfloor 14/Nt \rfloor$, where Nf is a quantity of frequency units in one frequency domain region, and the frequency domain region is a frequency range that the uplink cancellation signaling can indicate.

TABLE 3

| Length (symbol) of time domain region | Quantity Nt of time units indicated by time domain | Quantity Nf of frequency units indicated by frequency domain |
|---|---|---|
| 2 | 2 | 7 |
| 2 | 1 | 14 |
| 4 | 4 | 3 |
| 4 | 2 | 7 |
| 4 | 1 | 14 |
| 7 | 7 | 2 |
| 7 | 4 | 3 |
| 7 | 2 | 7 |
| 7 | 1 | 14 |
| 14 | 14 | 1 |
| 14 | 7 | 2 |
| 14 | 4 | 3 |
| 14 | 2 | 7 |
| 14 | 1 | 14 |
| 28 | 14 | 1 |
| 28 | 7 | 2 |
| 28 | 4 | 3 |
| 28 | 2 | 7 |

Further, in another optional embodiment, before monitoring the uplink cancellation signaling, the terminal may receive the following configuration information from the network device:

a time domain indication granularity, that is, a time unit Gt indicated by a time domain; and a length T of a time domain region (the time domain region is a time range that uplink cancellation signaling can indicate).

In this embodiment, the terminal may determine a frequency domain indication granularity according to the time domain indication granularity and a correspondence in Table 4 below. Optionally, a quantity Nf of frequency units indicated by a frequency domain satisfies that: $Nf=\lfloor 14/Nt \rfloor$, where Nf is a quantity of frequency units in one frequency domain region, and the frequency domain region is a frequency range that the uplink cancellation signaling can indicate.

TABLE 4

| Length (symbol) of time domain region | Time unit Gt (symbol) indicated by time domain | Quantity Nt = ⌈T/Gt⌉ of time units indicated by time domain | Quantity Nf of frequency units indicated by frequency domain |
|---|---|---|---|
| 2 | 1 | 2 | 7 |
| 2 | 2 | 1 | 14 |
| 4 | 1 | 4 | 3 |
| 4 | 2 | 2 | 7 |
| 4 | 4 | 1 | 14 |
| 7 | 1 | 7 | 2 |
| 7 | 2 | 4 | 3 |
| 7 | 4 | 2 | 7 |
| 7 | 7 | 1 | 14 |
| 14 | 1 | 14 | 1 |
| 14 | 2 | 7 | 2 |
| 14 | 4 | 4 | 3 |
| 14 | 7 | 2 | 7 |
| 14 | 14 | 1 | 14 |
| 28 | 2 | 14 | 1 |
| 28 | 4 | 7 | 2 |
| 28 | 7 | 4 | 3 |
| 28 | 14 | 2 | 7 |

Figure 8:
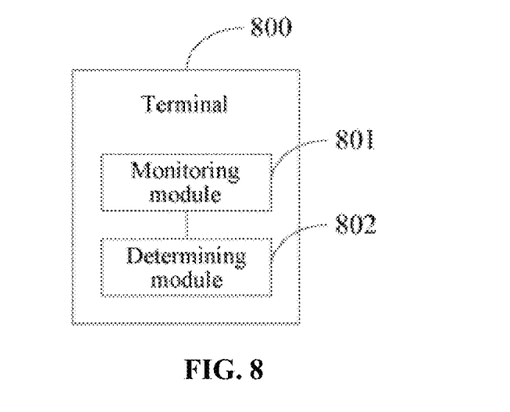
FIG. 8 is a structural diagram of a terminal according to an embodiment of the present disclosure.

FIG. 8 is a structural diagram of a terminal according to an embodiment of the present disclosure. As shown in FIG. 8, a terminal 800 includes:

a monitoring module 801, configured to monitor uplink cancellation signaling at a first moment; and a determining module 802, configured to determine, according to the uplink cancellation signaling, whether to cancel corresponding uplink transmission.

An interval between the first moment and a second moment of sending the uplink transmission is greater than or equal to a preset time length, and the first moment is before the second moment.

Optionally, the second moment includes any one of the following moments:

a starting moment of a slot in which a starting position of the uplink transmission is located;

a starting moment of a sub-slot in which a starting position of the uplink transmission is located;

a starting moment of a time region in which a starting position of the uplink transmission is located; or a moment located before a starting position of the uplink transmission and closest to the starting position of the uplink transmission in reference moments configured by a network device.

Optionally, the preset time length is a minimum processing time for the terminal to cancel the uplink transmission.

Optionally, the terminal 800 further includes:

a receiving module, configured to receive configuration information sent by a network device, where the configuration information is used for configuring a first physical downlink control channel (PDCCH) monitoring occasion, and the first PDCCH monitoring occasion is used for monitoring the uplink cancellation signaling at the first moment.

Optionally, the monitoring module 801 is further configured to monitor, in a case that a first PDCCH monitoring occasion is not configured, the uplink cancellation signaling before the first moment, where the first PDCCH monitoring occasion is used for monitoring the uplink cancellation signaling at the first moment.

Optionally, the monitoring module 801 is further configured to perform any one of the following:
monitoring the uplink cancellation signaling at a second PDCCH monitoring occasion closest to the first moment, where the second PDCCH monitoring occasion is before the first moment; monitoring the uplink cancellation signaling at one or more third PDCCH monitoring occasions, the third PDCCH monitoring occasion is a PDCCH monitoring occasion before the first moment; or
monitoring the uplink cancellation signaling at a PDCCH monitoring occasion between a third moment and the first moment, where the third moment is before the first moment.

Optionally, the third moment is a sending moment of target downlink control information (DCI), where the target DCI is used for scheduling the uplink transmission; or a time interval between the third moment and the sending moment of the target DCI is equal to a preset PDCCH processing time.

Optionally, the preset time length includes N time units, where N is a positive integer; and the time unit includes one of a slot, a subframe, a symbol, a sub-slot, or a symbol group.

The terminal provided in this embodiment of the present disclosure can implement various processes implemented by the terminal in the method embodiment of FIG. 2. To avoid repetition, details are not described herein again.

Figure 9:
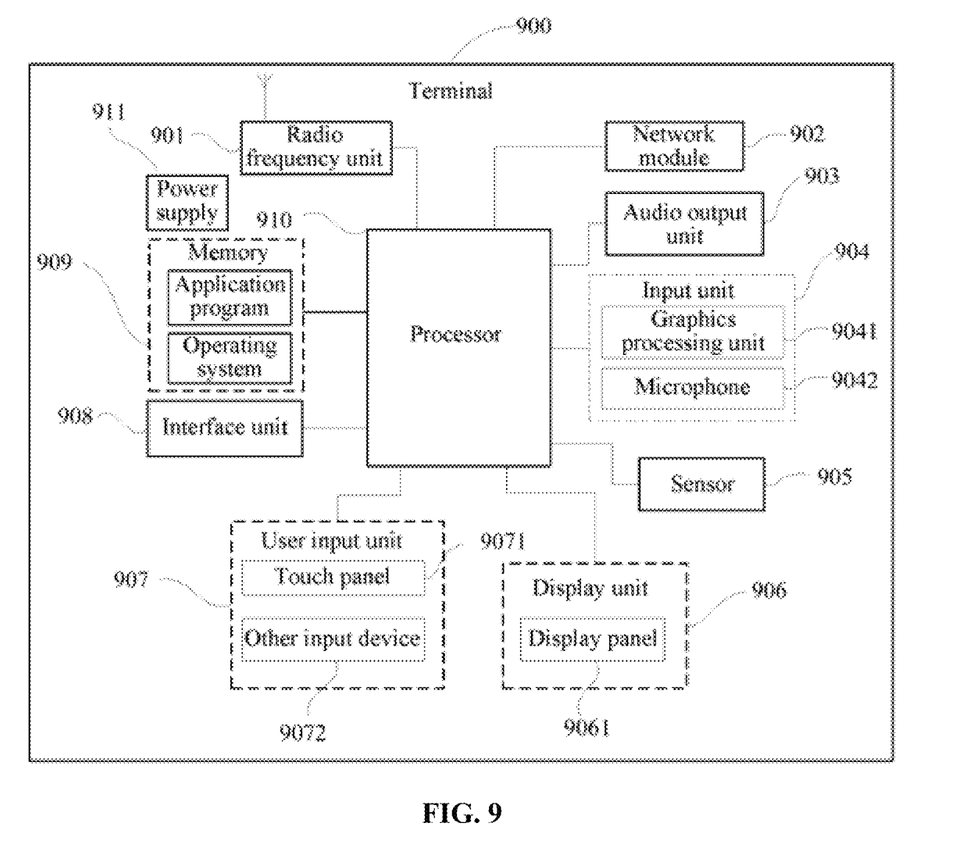
FIG. 9 is a structural diagram of another terminal according to an embodiment of the present disclosure.

FIG. 9 is a schematic diagram of a hardware structure of a terminal according to respective embodiments of the present disclosure.

The terminal 900 includes, but is not limited to, components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that a terminal structure shown in FIG. 9 constitutes no limitation on the terminal, and the terminal may include more or fewer components than those shown in the figure, or some components may be combined, or a different component deployment may be used. In the embodiments of the present disclosure, the method includes, but is not limited to, a mobile phone, a tablet computer, a notebook computer, a palmtop computer, an in-vehicle terminal, a wearable terminal, a pedometer, and the like.

The radio frequency unit 901 is configured to monitor uplink cancellation signaling at a first moment.

The processor 910 is configured to determine, according to the uplink cancellation signaling, whether to cancel corresponding uplink transmission.

An interval between the first moment and a second moment of sending the uplink transmission is greater than or equal to a preset time length, and the first moment is before the second moment.

It should be understood that, in this embodiment, the processor 910 and the radio frequency unit 901 can implement various processes implemented by the terminal in the method embodiment of FIG. 2. To avoid repetition, details are not described herein again.

It should be understood that, in the embodiments of the present disclosure, the radio frequency unit 901 may be configured to receive and transmit information or receive and transmit signals during a call. Specifically, after being received, downlink data from a base station is processed by the processor 910. In addition, uplink data is sent to the base station. Generally, the radio frequency unit 901 includes, but is not limited to, an antenna, at least one amplifier, a transceiver, a coupler, a low noise amplifier, a duplexer, and the like. In addition, the radio frequency unit 901 may further communicate with another device through a wireless communication system and network.

The terminal provides wireless broadband Internet access for a user through the network module 902, for example, help the user to send and receive emails, browse webpages, and access stream media, and the like.

The audio output unit 903 may convert audio data received by the radio frequency unit 901 or network module 902 or audio data stored on the memory 909 into audio signals and output the audio signals as sounds. Moreover, the audio output unit 903 may further provide an audio output (for example, a call signal receiving sound or a message receiving sound) related to a specific function implemented by the terminal 900. The audio output unit 903 includes a speaker, a buzzer, a receiver, and the like.

The input unit 904 is configured to receive an audio signal or a video signal. The input unit 904 may include a graphics processing unit (GPU) 9041 and a microphone 9042. The graphics processing unit 9041 processes image data of a static picture or a video obtained by an image capturing apparatus (for example, a camera) in a video capturing mode or an image capturing mode. An image frame that has been processed may be displayed on a display unit 906. The image frame that has been processed by the graphics processing unit 9041 may be stored on the memory 909 (or another storage medium) or sent by using the radio frequency unit 901 or network module 902. The microphone 9042 may receive a sound, and can process the sound into audio data. The processed audio data may be converted, in a phone call mode, into a format that may be sent to a mobile communication base station via the radio frequency unit 901 and be output.

The terminal 900 further includes at least one sensor 905 such as an optical sensor, a motion sensor, and another sensor. Specifically, the optical sensor includes an ambient light sensor and a proximity sensor. The ambient light sensor may adjust luminance of the display panel 9061 according to the luminance of the ambient light, and the proximity sensor may switch off the display panel 9061 and/or backlight when the terminal 900 is moved to the ear. As a type of motion sensor, an acceleration sensor can monitor magnitudes of accelerations in various directions (generally, on three axes), may detect a magnitude and a direction of the gravity in a static state, and may be applied to recognizing an attitude of the terminal (for example, switching between landscape orientation and portrait orientation, a related game, and magnetometer attitude calibration), a function related to vibration recognition (such as a pedometer and a knock), and the like. The sensor 905 may further include a fingerprint sensor, a pressure sensor, an iris sensor, a molecular sensor, a gyroscope, a barometer, a hygrometer, a thermometer, an infrared sensor, and the like, and details are not described herein.

The display unit 906 is configured to display information entered by the user or information provided for the user. The display unit 906 may include a display panel 9061. The display panel 9061 may be configured in a form of a liquid crystal display (LCD), an organic light-emitting diode (OLED), or the like.

The user input unit 907 may be configured to receive input digit or character information, and generate key signal input related to the user setting and function control of the terminal. Specifically, the user input unit 907 includes a touch panel 9071 and another input device 9072. The touch panel 9071, also referred to as a touchscreen, may collect a touch operation of a user on or near the touch panel (such as an operation of a user on or near the touch panel 9071 by using any suitable object or attachment, such as a finger or a touch pen). The touch panel 9071 may include two parts: a touch monitoring apparatus and a touch controller. The touch monitoring apparatus monitors a touch orientation of the user, monitors a signal brought by the touch operation, and transmits the signal to the touch controller. The touch controller receives touch information from the touch monitoring apparatus, converts the touch information into a contact coordinate, then transmits the contact coordinate to the processor 910, and receives and executes a command transmitted by the processor 910. In addition, the touch panel 9071 may be implemented by using various types, such as a resistive type, a capacitive type, an infrared type, and a surface acoustic wave type. In addition to the touch panel 9071, the user input unit 907 may further include the another input device 9072. Specifically, the another input device 9072 may include, but not limited to, a physical keyboard, a functional key (such as a volume control key or a switch key), a track ball, a mouse, and a joystick, which is not described herein in detail.

Further, the touch panel 9071 may cover the display panel 9061. After detecting a touch operation on or near the touch panel 9071, the touch panel transfers the touch operation to the processor 910, so as to determine a type of the touch event. Then, the processor 910 provides corresponding visual output on the display panel 9061 according to the type of the touch event. Although, in FIG. 9, the touch panel 9071 and the display panel 9061 are used as two separate parts to implement input and output functions of the terminal, in some embodiments, the touch panel 9071 and the display panel 9061 may be integrated to implement the input and output functions of the terminal. Details are not limited herein.

The interface unit 908 is an interface between an external apparatus and the terminal 900. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 908 may be configured to receive an input (such as data information or electric power) from an external apparatus and transmit the received input to one or more elements in the terminal 900 or may be configured to transmit data between the terminal 900 and the external apparatus.

The memory 909 may be configured to store a software program and various data. The memory 909 may mainly include a program storage area and a data storage area. The program storage area may store an operating system, an application required by at least one function (for example, a sound playback function or an image playback function), and the like. The data storage area may store data (for example, audio data and a phone book) created according to use of the mobile phone. In addition, the memory 909 may include a high speed random access memory, and may further include a non-volatile memory, such as at least one magnetic disk storage device, a flash memory device, or other non-volatile solid state storage devices.

The processor 910 is the control center of the terminal, and is connected to various parts of the terminal by using various interfaces and lines. By running or executing the software program and/or module stored in the memory 909, and invoking data stored in the memory 909, the processor 910 performs various functions and data processing of the terminal, thereby performing overall monitoring on the terminal. Optionally, the processor 910 may include one or more processing units. Optionally, the processor 910 may integrate an application processor and a modem processor. The application processor mainly processes an operating system, a user interface, an application program, and the like, and the modem processor mainly processes wireless communication. It may be understood that the modulation and demodulation processor may not be integrated into the processor 910.

The terminal 900 further includes the power supply 911 (such as a battery) for supplying power to the components. Optionally, the power supply 911 may be logically connected to the processor 910 by a power management system, thereby implementing functions, such as charging, discharging, and power consumption management, by using the power management system.

In addition, the terminal 900 includes some function modules that are not shown, which is not described herein in detail.

Optionally, the embodiments of the present disclosure further provide a terminal, including a processor 910, a memory 909, and a computer program stored on the memory 909 and executable on the processor 910, where when executed by the processor 910, the computer program implements respective processes of the embodiments of the uplink transmission control method, and can achieve the same technical effects. To avoid repetition, details are not described herein again.

The embodiments of the present disclosure further provide a non-transitory computer-readable storage medium, storing a computer program, where when executed by a processor, the computer program implements respective processes of the embodiments of the uplink transmission control method on a terminal side provided by the embodiments of the present disclosure, and can achieve the same technical effects. To avoid repetition, details are not described herein again. The non-transitory computer-readable storage medium may include a read-only memory (ROM), a random access memory (RAM), a magnetic disk, and an optical disc.

It should be noted that terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Without more limitations, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present disclosure essentially or the part contributing to the related technology may be implemented in a form of a software product. The computer software product is stored in a storage medium (such as a ROM/RAM, a magnetic disk, or an optical disc) and includes several instructions for instructing a terminal device (which may be a mobile phone, a computer, a server, an air conditioner, a base station, or the like) to perform the methods described in the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. A person of ordinary skill in the art may derive various forms from the present disclosure without departing from the spirit of the present disclosure and the scope claimed by the claims, which are all under the protection of the present disclosure.

What is claimed is:

1. An uplink transmission control method, applied to a terminal, comprising:
    monitoring uplink cancellation signaling at a first moment; and
    determining, according to the uplink cancellation signaling, whether to cancel corresponding uplink transmission, wherein
    an interval between the first moment and a second moment of sending the uplink transmission is greater than or equal to a preset time length, and the first moment is before the second moment,
    wherein, the method further comprises:
    receiving first configuration information, wherein the first configuration information comprises a quantity of time units indicated by time domain;
    determining a quantity of frequency units indicated by the uplink cancellation signaling according to the first configuration information and the uplink cancellation signaling,
    wherein the quantity of frequency units satisfies that: $Nf=\lfloor 14/Nt \rfloor$, Nf is a quantity of frequency units in one frequency domain region, and the frequency domain region is a frequency range indicated by the uplink cancellation signaling, Nt is a quantity of time units in a monitoring period.

2. The method according to claim 1, wherein the first configuration information further comprises:
    a length of a time domain region, wherein the time domain region is a time range that uplink cancellation signaling is capable of indicating,
    the length of the time domain region, the quantity of time units indicated by time domain, and the quantity of frequency units satisfy following relations:

| the length of the time domain region | the quantity of time units | the quantity of frequency units |
|---|---|---|
| 2 | 2 | 7 |
| 2 | 1 | 14 |
| 4 | 2 | 7 |
| 4 | 1 | 14 |
| 7 | 7 | 2 |
| 7 | 2 | 7 |
| 7 | 1 | 14 |
| 14 | 14 | 1 |
| 14 | 7 | 2 |

-continued

| the length of the time domain region | the quantity of time units | the quantity of frequency units |
|---|---|---|
| 14 | 2 | 7 |
| 14 | 1 | 14. |

3. The method according to claim 1, wherein the preset time length is a minimum processing time for the terminal to cancel the uplink transmission.

4. The method according to claim 1, wherein before the monitoring uplink cancellation signaling at a first moment, the method further comprises:
    receiving configuration information sent by a network device, wherein the configuration information is used for configuring a first physical downlink control channel (PDCCH) monitoring occasion, and the first PDCCH monitoring occasion is used for monitoring the uplink cancellation signaling at the first moment.

5. The method according to claim 1, wherein the method further comprises:
    monitoring, in a case that a first PDCCH monitoring occasion is not configured, the uplink cancellation signaling before the first moment, wherein the first PDCCH monitoring occasion is used for monitoring the uplink cancellation signaling at the first moment.

6. The method according to claim 5, wherein the monitoring the uplink cancellation signaling before the first moment comprises any one of the following:
    monitoring the uplink cancellation signaling at a second PDCCH monitoring occasion closest to the first moment, wherein the second PDCCH monitoring occasion is before the first moment;
    monitoring the uplink cancellation signaling at one or more third PDCCH monitoring occasions, the third PDCCH monitoring occasion is a PDCCH monitoring occasion before the first moment; or
    monitoring the uplink cancellation signaling at a PDCCH monitoring occasion between a third moment and the first moment, wherein the third moment is before the first moment.

7. The method according to claim 1, further comprising:
    cancelling the corresponding uplink transmission when a target moment is earlier than the first moment;
    wherein the target moment is a moment for scheduling downlink control information (DCI) of the uplink transmission.

8. The method according to claim 1, wherein the preset time length comprises N time units, wherein N is a positive integer; and the time unit comprises one of a slot, a subframe, a symbol, a sub-slot, or a symbol group.

9. A terminal, comprising: a memory, a processor, and a program stored on the memory and executable on the processor, wherein when executed by the processor, the program implements:
    monitoring uplink cancellation signaling at a first moment; and
    determining, according to the uplink cancellation signaling, whether to cancel corresponding uplink transmission, wherein
    an interval between the first moment and a second moment of sending the uplink transmission is greater than or equal to a preset time length, and the first moment is before the second moment,
    wherein, the program further implements:

receiving first configuration information, wherein the first configuration information comprises a quantity of time units indicated by time domain;
determining a quantity of frequency units indicated by the uplink cancellation signaling according to the first configuration information and the uplink cancellation signaling,
wherein the quantity of frequency units satisfies that: $Nf=\lfloor 14/Nt \rfloor$, Nf is a quantity of frequency units in one frequency domain region, and the frequency domain region is a frequency range indicated by the uplink cancellation signaling, Nt is a quantity of time units in a monitoring period.

10. The terminal according to claim 9, wherein the first configuration information further comprises:
a length of a time domain region, wherein the time domain region is a time range that uplink cancellation signaling is capable of indicating,
the length of the time domain region, the quantity of time units indicated by time domain, and the quantity of frequency units satisfy following relations:

| the length of the time domain region | the quantity of time units | the quantity of frequency units |
|---|---|---|
| 2 | 2 | 7 |
| 2 | 1 | 14 |
| 4 | 2 | 7 |
| 4 | 1 | 14 |
| 7 | 7 | 2 |
| 7 | 2 | 7 |
| 7 | 1 | 14 |
| 14 | 14 | 1 |
| 14 | 7 | 2 |
| 14 | 2 | 7 |
| 14 | 1 | 14. |

11. The terminal according to claim 9, wherein the preset time length is a minimum processing time for the terminal to cancel the uplink transmission.

12. The terminal according to claim 9, wherein before the monitoring uplink cancellation signaling at a first moment, the program further implements:
receiving configuration information sent by a network device, wherein the configuration information is used for configuring a first physical downlink control channel (PDCCH) monitoring occasion, and the first PDCCH monitoring occasion is used for monitoring the uplink cancellation signaling at the first moment.

13. The terminal according to claim 9, wherein the program further implements:
monitoring, in a case that a first PDCCH monitoring occasion is not configured, the uplink cancellation signaling before the first moment, wherein the first PDCCH monitoring occasion is used for monitoring the uplink cancellation signaling at the first moment.

14. The terminal according to claim 13, wherein the monitoring the uplink cancellation signaling before the first moment comprises any one of the following:
monitoring the uplink cancellation signaling at a second PDCCH monitoring occasion closest to the first moment, wherein the second PDCCH monitoring occasion is before the first moment;
monitoring the uplink cancellation signaling at one or more third PDCCH monitoring occasions, the third PDCCH monitoring occasion is a PDCCH monitoring occasion before the first moment; or
monitoring the uplink cancellation signaling at a PDCCH monitoring occasion between a third moment and the first moment, wherein the third moment is before the first moment.

15. The terminal according to claim 9, wherein the program further implements:
cancelling the corresponding uplink transmission when a target moment is earlier than the first moment;
wherein the target moment is a moment for scheduling downlink control information (DCI) of the uplink transmission.

16. The terminal according to claim 9, wherein the preset time length comprises N time units, wherein N is a positive integer; and the time unit comprises one of a slot, a sub-frame, a symbol, a sub-slot, or a symbol group.

17. A non-transitory computer-readable storage medium, storing a computer program, wherein when executed by a processor, the computer program implements:
monitoring uplink cancellation signaling at a first moment; and
determining, according to the uplink cancellation signaling, whether to cancel corresponding uplink transmission, wherein
an interval between the first moment and a second moment of sending the uplink transmission is greater than or equal to a preset time length, and the first moment is before the second moment,
wherein, the computer program further implements:
receiving first configuration information, wherein the first configuration information comprises a quantity of time units indicated by time domain;
determining a quantity of frequency units indicated by the uplink cancellation signaling according to the first configuration information and the uplink cancellation signaling,
wherein the quantity of frequency units satisfies that: $Nf=\lfloor 14/Nt \rfloor$, Nf is a quantity of frequency units in one frequency domain region, and the frequency domain region is a frequency range indicated by the uplink cancellation signaling, Nt is a quantity of time units in a monitoring period.

18. The non-transitory computer-readable storage medium according to claim 17, wherein the first configuration information further comprises:
a length of a time domain region, wherein the time domain region is a time range that uplink cancellation signaling is capable of indicating,
the length of the time domain region, the quantity of time units indicated by time domain, and the quantity of frequency units satisfy following relations:

| the length of the time domain region | the quantity of time units | the quantity of frequency units |
|---|---|---|
| 2 | 2 | 7 |
| 2 | 1 | 14 |
| 4 | 2 | 7 |
| 4 | 1 | 14 |
| 7 | 7 | 2 |
| 7 | 2 | 7 |
| 7 | 1 | 14 |
| 14 | 14 | 1 |
| 14 | 7 | 2 |
| 14 | 2 | 7 |
| 14 | 1 | 14. |

19. The non-transitory computer-readable storage medium according to claim 17, wherein the preset time length is a minimum processing time for the terminal to cancel the uplink transmission.

20. The non-transitory computer-readable storage medium according to claim 17, wherein before the monitoring uplink cancellation signaling at a first moment, the program further implements:
- receiving configuration information sent by a network device, wherein the configuration information is used for configuring a first physical downlink control channel (PDCCH) monitoring occasion, and the first PDCCH monitoring occasion is used for monitoring the uplink cancellation signaling at the first moment.

* * * * *